(12) United States Patent
Kim

(10) Patent No.: US 7,453,599 B2
(45) Date of Patent: Nov. 18, 2008

(54) COLOR PROCESSING METHOD OF IMAGE FORMING DEVICE AND APPARATUS USING THE SAME

(75) Inventor: Man-chan Kim, Suwon-si (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 827 days.

(21) Appl. No.: 10/964,653

(22) Filed: Oct. 15, 2004

(65) Prior Publication Data

US 2005/0083558 A1     Apr. 21, 2005

(30) Foreign Application Priority Data

Oct. 18, 2003    (KR) ..................... 10-2003-0072780

(51) Int. Cl.
*H04N 1/60* (2006.01)
*G06K 15/00* (2006.01)
*G06K 9/00* (2006.01)
*G03F 3/08* (2006.01)

(52) U.S. Cl. .................. 358/1.9; 358/523; 358/1.16; 358/518; 358/3.23; 358/1.18; 345/593; 345/594; 382/162; 382/167

(58) Field of Classification Search ............ 358/1.9, 358/1.16, 518, 3.23, 1.18, 523; 345/593, 345/603, 604, 341, 854, 770, 594; 382/162, 382/167

See application file for complete search history.

(56) References Cited

U.S. PATENT DOCUMENTS

| 5,579,031 | A  | * | 11/1996 | Liang ........................ 345/604 |
| 6,351,320 | B1 | * | 2/2002  | Shin .......................... 358/1.9 |
| 6,525,721 | B1 | * | 2/2003  | Thomas et al. ............. 345/600 |
| 7,068,380 | B2 | * | 6/2006  | Milton et al. ............. 358/1.13 |
| 2003/0035127 | A1 | * | 2/2003 | Nakami ..................... 358/1.9 |

FOREIGN PATENT DOCUMENTS

| JP | 10-200772 | 7/1998 |
| JP | 11-115250 | 4/1999 |
| JP | 11-316669 | 11/1999 |
| JP | 2000-134495 | 5/2000 |
| JP | 2002-084433 | 3/2002 |

* cited by examiner

*Primary Examiner*—Edward L Coles
*Assistant Examiner*—Charlotte M Baker
(74) *Attorney, Agent, or Firm*—Stanzione & Kim, LLP

(57) ABSTRACT

A color processing method of an image forming device, and an apparatus using the same. In the image forming device, which prints data in a plurality of colors, the color processing method may include storing a plurality of color tables, each color table containing a reference factor used with color processing of image data of an original document, selecting one of the plurality of color tables, processing a color of the image data of the original document with reference to the selected color table, and converting and outputting the color-processed image data of the original document into a data format readable by the image forming device. Accordingly, a user can change the color representation of the printed image according to a predetermined mode.

22 Claims, 6 Drawing Sheets

FIG. 6

| HEADER |
|---|
| MODE-DB ITEM INDEX MAPPING TABLE |
| DB ITEM #0 |
| DB ITEM #1 |
| .... |
| DB ITEM #n |

COLOR PROCESSING METHOD OF IMAGE FORMING DEVICE AND APPARATUS USING THE SAME

CROSS-REFERENCE TO RELATED APPLICATIONS

This application claims the benefit of Korean Patent Application No. 2003-72780 filed Oct. 18, 2003, in the Korean Intellectual Property Office, the disclosure of which is incorporated herein by reference.

BACKGROUND OF THE INVENTION

1. Field of the Invention

The present general inventive concept relates to a color processing method of an image forming device and an apparatus using the same, and more particularly, to a color processing method of an image forming device which enables a user to change colors of a printed image by processing the colors differently according to certain user-determined modes.

2. Description of the Related Art

An image forming device generally refers to an apparatus which prints an image onto a recording medium, such as a printing paper, in accordance with image data of a certain document. Such an image forming device includes, for example, printers, copiers and facsimile machines. The image forming device may also construct a printing system by being connected to a host device such as a computer.

FIG. 1 is a block diagram of a conventional printing system. Referring to FIG. 1, the conventional printing system comprises a host device 10, a color table storage part 17, a user input device 20 and an image forming part 30. The host device 10 comprises a user interface part 11, a color processing part 13 and an output part 15.

Image data of an original document or user commands for the control of an operation of the image forming part 30 are inputted to the host device 10 through the user input device 20. The user interface part 11 of the host device 10 provides a user interface. The color processing part 13 carries out color processing with respect to the data outputted from the user interface part 11 to provide color space conversion. More specifically, the color processing part 13 carries out color processing with reference to one of color tables stored in the color table storage unit 17. The color tables of the color processing part 13 are predefined by a user through the user input device 20. The output part 15 converts and outputs the data from the color processing part 13 to the image forming part 30 in a data format recognizable by the image forming part 30. The image forming part 30 interprets the data from the host device 10, constructs a page of fonts according to a print type and character construction, and records the data on a printing paper.

In the conventional printing system, a corresponding color table has to be re-loaded to the host device 10 from the color table storage part 17, which is an external recording device with respect to the host device 10. Additionally, with the influence on the color of the printed image due to changes in a printing paper type or a degree of resolution taken into consideration, the user is required to select and re-load an appropriate color table from the color table storage part 17 to obtain a satisfactory color image. However, in the conventional printing system, and especially in the printing system in an automatic mode which automatically recognizes the printing paper, the color quality of the printed image is usually affected by the discrepancy between a set mode and a color table.

SUMMARY OF THE INVENTION

In order to solve the above and/or other problems, it is an aspect of the general inventive concept to provide a color processing method of an image forming device which is capable of processing colors of a printed image differently in accordance with modes set by a user, and to provide an apparatus using the same.

Additional aspects and advantages of the general inventive concept will be set forth in part in the description which follows and, in part, will be obvious from the description, or may be learned by practice of the general inventive concept.

The above and/or other aspects of the general inventive concept can be substantially achieved by providing a color processing method of an image forming device which prints data in a plurality of colors, the color processing method including storing a plurality of color tables, each color table containing a reference factor to provide color processing of image data of an original document, selecting one of the plurality of color tables, processing the color of the image data of the original document with reference to the selected color table, and converting and outputting the color-processed image data of the original document into a data format readable by the image forming device.

In an aspect of the general inventive concept, the selecting of the one of the color tables may include setting a printing mode to select the one of the color tables.

In another aspect of the general inventive concept, the reference factor contained in the color table may include a factor for color space conversion and a factor for color gamut matching.

The above and/or other aspects of the general inventive concept can also be achieved by providing a color processing apparatus used with an image forming device which prints data in a plurality of colors, the color processing apparatus including a database part to contain a plurality of color tables, each color table containing a reference factor to provide color processing of image data of an original document, an interface part to provide a menu to select among the color tables, a color processing part to process the color of the image data of the original document with reference to the color table selected through the menu, and an output part to convert and output the data processed at the color processing part into a data format readable by the image forming device.

In an aspect of the general inventive concept, a user input device may have a menu display function, and a user selection command can be inputted through the user input device to select one of the color tables.

In another aspect of the general inventive concept, the reference factor contained in the color table may include a factor used with color space conversion and a factor used with color gamut matching.

The above and/or other aspects of the general inventive concept can also be achieved by providing a computer-readable recording medium which provides commands in connection with the execution of a color processing method of an image forming device in a computer. The color processing method may include storing a plurality of color tables, each color table containing a reference factor used with color processing of image data of an original document, selecting one of the color tables, processing the color of the image data of the original document with reference to the selected color table, and converting and outputting the color-processed image data of the original document into a data format readable by the image forming device.

In an aspect of the general inventive concept, the selecting of the one of the color tables may include setting a printing mode to select the one of the color tables.

BRIEF DESCRIPTION OF THE DRAWINGS

These and/or other aspects and advantages of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
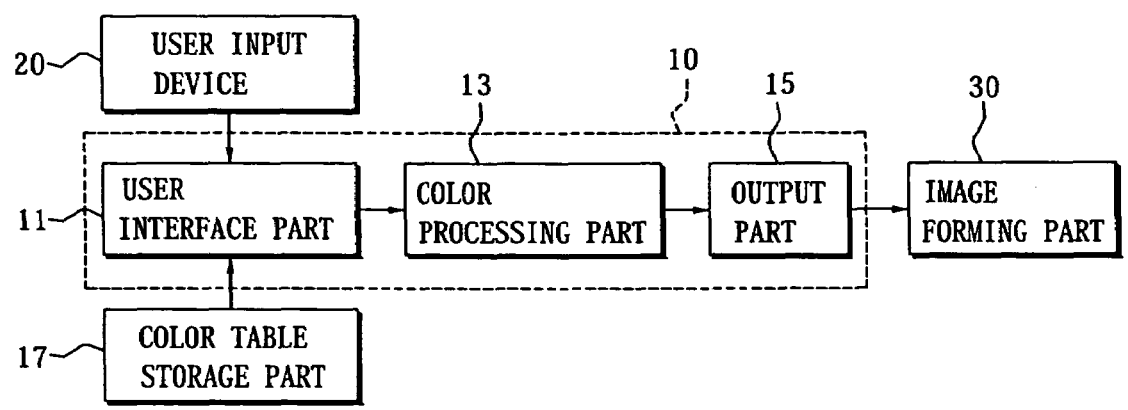
FIG. 1 is a block diagram of a conventional printing system.

Reference will now be made in detail to the embodiments of the present general inventive concept, examples of which are illustrated in the accompanying drawings, wherein like reference numerals refer to the like elements throughout. The embodiments are described below in order to explain the present invention by referring to the figures.

The matters defined in the description, such as a detailed construction and elements, are nothing but the ones provided to assist in a comprehensive understanding of the general inventive concept. Thus, it is apparent that the present general inventive concept can be carried out without those defined matters. Also, well-known functions or constructions are not described in detail since they would obscure the general inventive concept in unnecessary detail.

Figure 2:
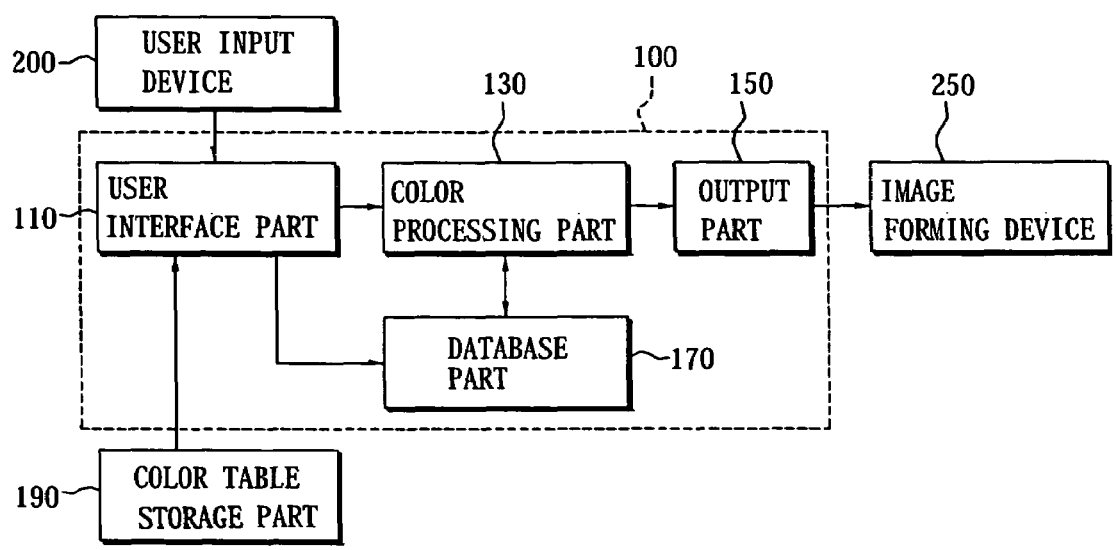
FIG. 2 is a block diagram illustrating a printing system utilizing a color processing method of an image forming device according to an embodiment of the general inventive concept.

FIG. 2 is a block diagram illustrating a printing system utilizing a color processing method of an image forming device according to an embodiment of the general incentive concept.

Referring to FIG. 2, the printing system may include a host device 100, a color table storage part 190, a user input device 200 and an image forming device 250. The host device 100 may include a user interface part 110, a color processing part 130, an output part 150 and a database part 170.

The user input device 200 can receive an input of image data of an original document which will be printed by the image forming device 250, or receives commands to control an operation of the host device 100 and/or the image forming device 250. The user input device 200 can be provided with a display device (not shown) which displays the status of the input and an output with respect to the host device 100.

The user interface part 110 of the host device 100 can provide a user interface. At this stage, a graphic user interface (GUI) can be utilized such that items of operations are displayed in the form of icons or a menu, and the user carries out processes of the GUI through, for example, a mouse.

The color processing part 130 can carry out color processing with respect to the output data from the user interface part 110. The color processing may include a process of converting color spaces or matching color gamut when the color space or color gamut of the original image data is different from those of the image forming device 250. The color space defines the colors, in other words, defines a relationship among the colors, and the color gamut refers to a range of reproducible colors. Color reproducing devices can be usually provided with their own color spaces and color gamut.

The database part 170 can store databases of a plurality of color tables used in the processing of the color processing part 130 and data of necessary settings. The color table can contain reference factors used in the color space conversion and/or the color gamut matching, and the printed image has a corresponding color according to the color table in use.

The output part 150 can convert the color processed data from the color processing part 130 into a data format recognizable by the image forming device 250, and can output the data format to the image forming device 250. The image forming device 250 can interpret the data output from the host device 100, construct a page of fonts necessary for a print type and a character construction, and accordingly can print on a printing paper according to the constructed page of the fonts. The color processing part 130 may also use a color table stored to the color table storage part 190 which is employed as an external recording device.

Figure 3:
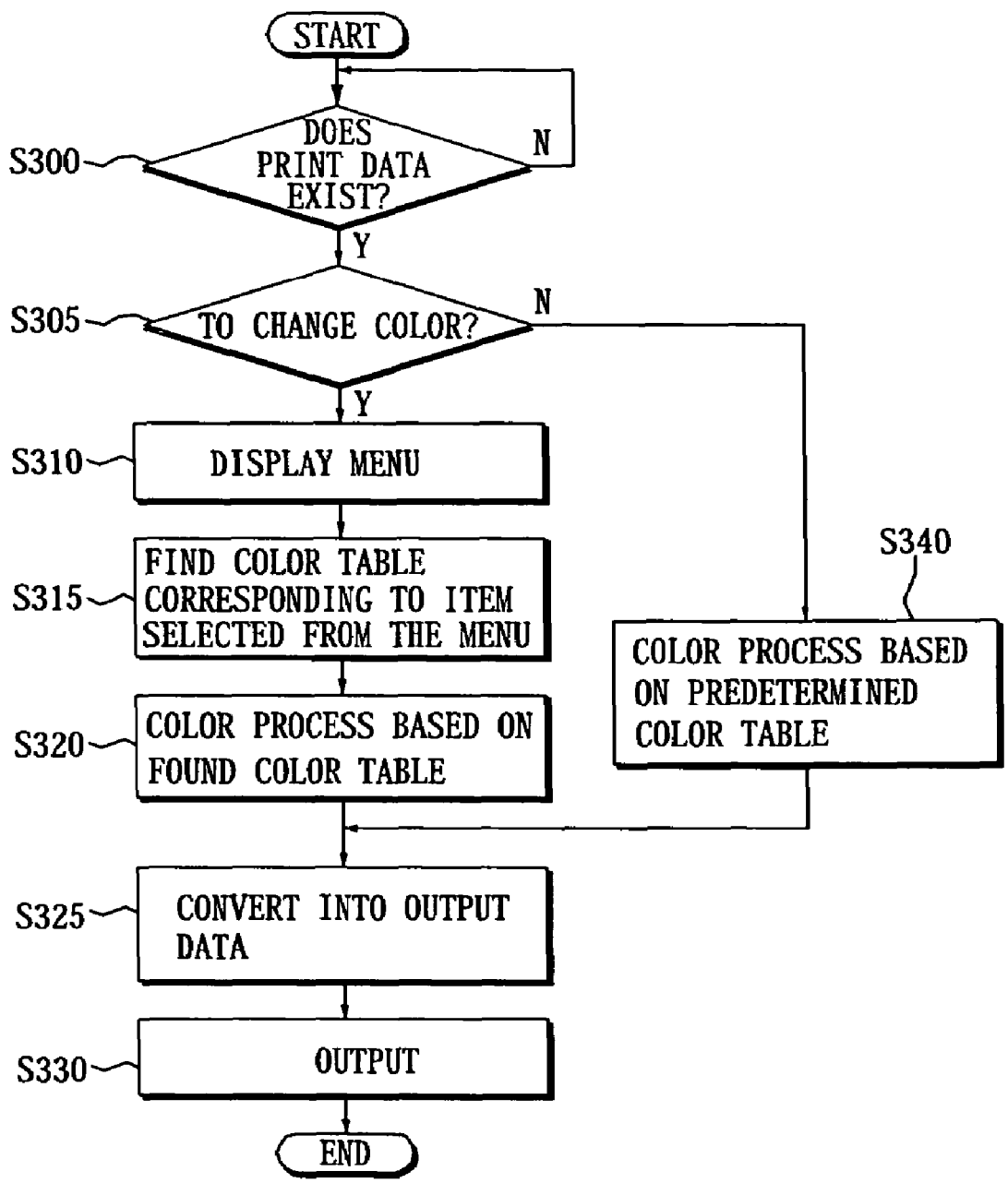
FIG. 3 is a flowchart illustrating respective stages of a color processing method according to another embodiment of the general inventive concept.

FIG. 3 is a flowchart illustrating respective stages of a color processing method of an image forming device according to another embodiment of the general inventive concept.

Referring to FIGS. 2 and 3, the host device 100 can be in standby mode to store the original data to be printed in the image forming device 250 in operation S300, and can determine whether the color needs changing in accordance with the various factors, such as mode change, if the original data to be printed exists. If color change is not necessary, color processing can be carried out in accordance with a currently-set color table in operation S340, the data can be converted into an available format which can be read by the image forming device 250 in operation S325, and the converted data can be outputted to the image forming device 250.

Meanwhile, if the color change is required, menus relating to the color processing can be displayed in operation S310. The menus used with the color processing may be displayed upon request by the user. The color processing menus can be provided from the user interface part 110 to be displayed on the display part of the image input device 200.

Figure 4:
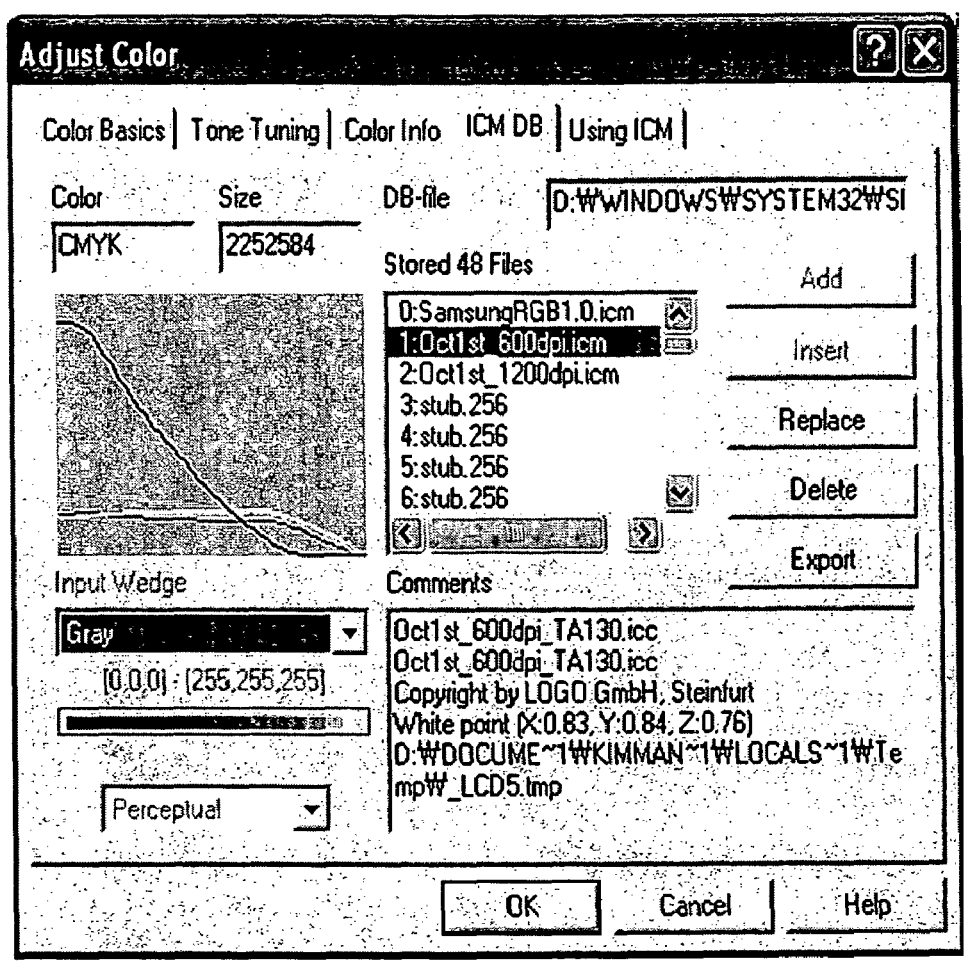
FIG. 4 is a view illustrating an example of a menu of color processing.
Figure 5:
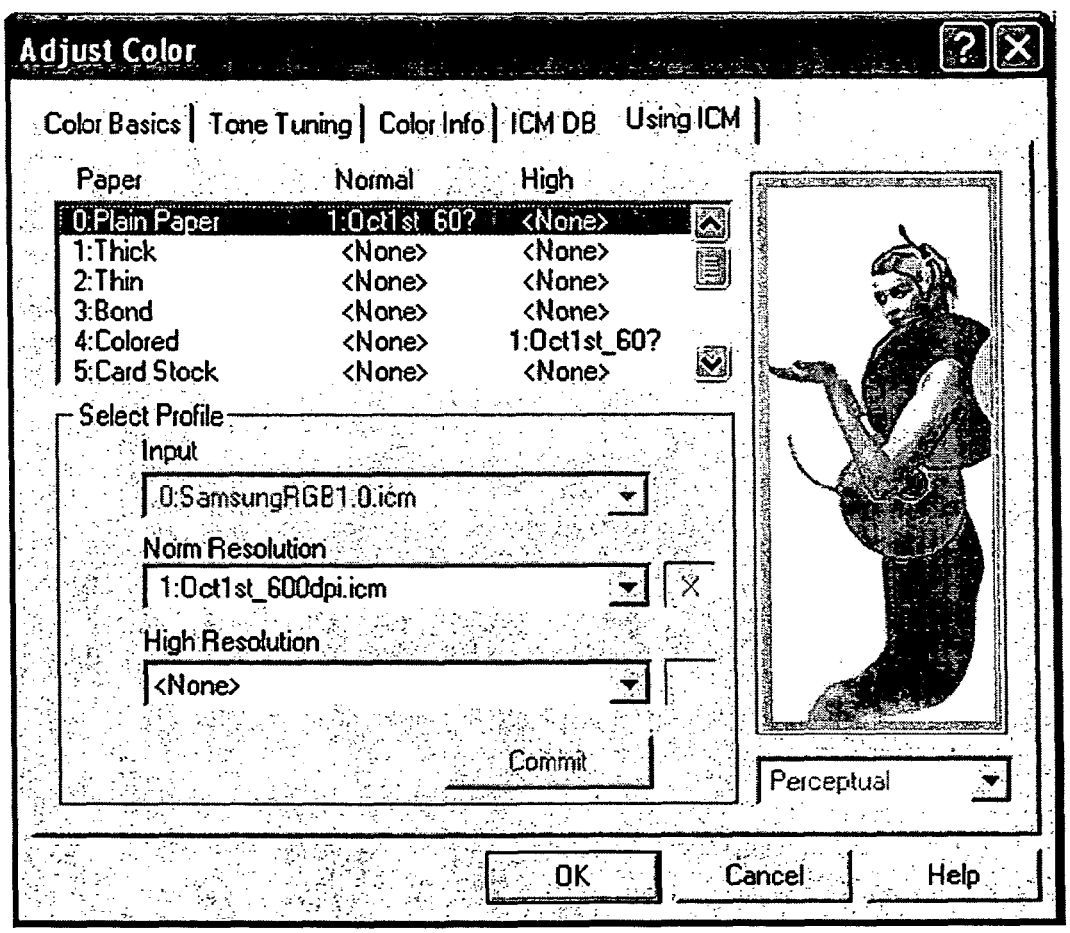
FIG. 5 is a view illustrating a structure of data stored in a database part of the printing system of FIG. 2.

FIGS. 4 and 5 are views illustrating one example of a color processing menu. More specifically, FIG. 4 illustrates a case in which a sub-menu "ICM DB" is selected from the color processing menu. The menu indicates file names of the respective color tables stored in the database part 170 such that the user can select one of the displayed files. FIG. 5 shows the file "1:Oct1st_600 dpi.icm" selected and can also show simulation of the color processing by the selected file at the right side. The user selected file can be linked to a corresponding color table. FIG. 6 shows a structure of the database stored in the database part 170. The database shown in FIG. 6 can store a header, a DB item index mapping table, and a DB item #0~#n in order.

The user host device and an image forming device may link the selected file "1:Oct1st_600 dpi.icm" to a printing paper "Plain Paper" by selecting a sub-menu "Using ICM." More specifically, by selecting the "Plain Paper" as the printing paper, the user can map such that the color table corresponding to the file "1:Oct1st_600 dpi.icm" can be used. This information can be stored in a mapping table of the database part 170.

When a certain item is selected from the menu associated with the color signal processing, a corresponding color table can be searched in operation S315, and the color processing can be carried out at the color processing part 130 according to the corresponding color table as searched in operation S320. After the color processing, the data can be converted into a data format readable by the image forming device 250 in operation S325. The data can be outputted to the image forming device 250 in operation S330, and the image forming device 250 can carry out a printing process in accordance with the data outputted from the host device 100. Through the processes as described above, the user can change colors of the image, or the colors of the image can be automatically changed if the user sets a certain mode.

While an embodiment of the present general inventive concept as described above depicts the database part 170 being provided to the host device 100, it is of course possible to provide the database part 170 in a controller of the image forming device 250. Additionally, a color processing method of the image forming device according to the general inventive concept may be realized at a hardware level or in appropriate programs to be implemented in the computers.

As described above in a few exemplary embodiments of the present general inventive concept, a user can change the color representation of the printed image of the image forming device, by use of a simple menu. Additionally, the user can change the color representation of the image without requiring additional color processing processes, by linking appropriate color tables to a certain mode he/she has set.

The foregoing advantages of the general inventive concept are merely exemplary and are not to be construed as limiting thereof. The present concept herein can be readily applied to other types of apparatuses. Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A color processing method of an image forming apparatus which prints data in a plurality of colors, the color processing method comprising:
    storing a plurality of color tables, each color table containing a reference factor used with color processing of image data of an original document, the reference factor having a factor used with color space conversion and a factor used with color gamut matching;
    selecting one among the plurality of color tables;
    processing a color of the image data of the original document with reference to the selected color table; and
    converting and outputting the color-processed image data of the original document into a data format readable by the image forming apparatus.

2. The color processing method of claim 1, further comprising:
    selecting one of the color tables to correspond to a predetermined printing mode.

3. A computer-readable medium having recorded thereon a program to implement a color processing method used with an image forming device that prints color images, the method comprising:
    determining if color changes need to be performed on color image data;
    selectively providing one of several color processing menus on a display of the image forming device, each of the color processing menus relating to color processing if it is determined in the determining operation that color changes are needed; and
    performing color processing according to color processing menu selected,
    wherein the menus indicate file names of respective color tables, each color table containing reference factors used in color space conversion, or color gamut matching, or color space conversion and color gamut matching of the color image to be printed.

4. A color processing apparatus used with an image forming apparatus which prints data in a plurality of colors, the color processing apparatus comprising:
    a database part to contain a plurality of color tables, each color table containing a reference factor used with color processing of image data of an original document, the reference factor having a factor used with color space conversion and a factor used with color gamut matching;
    an interface part to provide a menu through which at least one of the color tables is selected;
    a color processing part to process a color of the image data of the original document with reference to the color table selected through the menu; and
    an output part to convert and output the data processed at the color processing part into a data format readable by the image forming apparatus.

5. The color processing apparatus of claim 4, further comprising:
    a user input device having a display part to indicate the menu wherein a user selection command is inputted through the menu to select one of the plurality of color tables.

6. The color processing apparatus of claim 4, wherein the image forming apparatus comprises a host device and an image forming device connected to the host device to receive the processed image data as the converted data format according to the selected one of the color tables, and the database part is included in one of the host device and the image forming device in a single body.

7. The color processing apparatus of claim 4, wherein the database part further stores mapping information according to a determination of which one of the color tables is mapped in accordance with a predetermined printing mode.

8. The color processing apparatus of claim 4, wherein the interface part provides a graphic user interface through which one of a plurality of modes is set to control the database part and the color processing part, and the processing part determines whether the set mode is an automatic setting mode, to control the database part to store mapping information corresponding to the one of the color tables to automatically perform color gamut matching according to the stored mapping information.

9. The color processing apparatus of claim 8, wherein the processing part determines whether the set mode is a printing mode, and the one of the color tables is manually selected through the menu to perform color gamut matching of the color processing of the image data when the image forming apparatus prints data in a plurality of colors.

10. The color processing apparatus of claim 4, wherein the interface part provides a graphic user interface having the menu through which the one of the color tables is selected.

11. The color processing apparatus of claim 4, wherein the interface part provides a graphic user interface having an icon representing the menu through which the one of the color tables is selected.

12. The color processing apparatus of claim 4, wherein the interface part provides a graphic user interface having file names representing respective color tables, and the one of the color tables is selected by selecting one of the file names.

13. The color processing apparatus of claim 4, wherein the database part stores a database containing the color tables.

14. The color processing apparatus of claim 13, wherein the interface part provides a graphic user interface having a window to display a structure of the database representing the color tables and including at least one of a header, a DB item index mapping table, and DB items.

15. The color processing apparatus of claim 4, wherein the interface part provides a graphic user interface having file names representing respective color tables, and the graphic user interface comprises a window to display a simulation of the color processing of the image data according to the selected one of the color tables.

16. The color processing apparatus of claim 15, wherein the graphic user interface displays a second simulation of the color processing of the image data when another one of the color tables is selected.

17. The color processing apparatus of claim 4, wherein the interface part provides a graphic user interface having file names representing respective color tables, the graphic user interface comprises a window through which a type of printing paper is selected, and the database part stores a mapping table for color gamut matching according to the selected one of the color tables and the selected type of the printing paper.

18. The color processing apparatus of claim 17, wherein the color processing part performs the color processing of the image data according to the mapping table when the image forming apparatus prints data in a plurality of colors.

19. A color processing method used with an image forming device that prints color images, comprising:
   determining if color changes need to be performed on color image data;
   selectively providing one of several color processing menus on a display of the image forming device, each of the color processing menus relating to color processing if it is determined in the determining operation that color changes are needed; and
   performing color processing according to color processing menu selected,
   wherein the menus indicate file names of respective color tables, each color table containing reference factors used in color space conversion, or color gamut matching, or color space conversion and color gamut matching of the color image to be printed.

20. The method of claim 19, wherein when a file is selected, a simulation of the color processing is provided on the display.

21. A computer-readable recording medium which provides commands in connection with the execution of a color processing operation of an image forming apparatus to a computer, the color processing operation comprising:
   storing a plurality of color tables, each color table containing a reference factor for color processing of image data of an original document, the reference factor having a factor used with color space conversion and a factor used with color gamut matching;
   selecting one of the color tables;
   processing a color of the image data of the original document with reference to the selected color table; and
   converting and outputting the color-processed image data of the original document into a data format readable by the image forming apparatus.

22. The computer-readable recording medium of claim 21, further comprising:
   selecting one of the color tables to correspond to a predetermined printing mode.

* * * * *